(12) United States Patent
Pein et al.

(10) Patent No.: US 8,317,132 B2
(45) Date of Patent: Nov. 27, 2012

(54) QUICK-CHANGE FASTENING SYSTEM FOR MOUNTING AN ELEMENT TO A FASTENING STRUCTURE

(75) Inventors: Marc Pein, Hamburg (DE); André Boehme, Hamburg (DE); Dirk Humfeldt, Hamburg (DE); Jan Schroeder, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 406 days.

(21) Appl. No.: 12/489,962

(22) Filed: Jun. 23, 2009

(65) Prior Publication Data

US 2010/0200696 A1 Aug. 12, 2010

Related U.S. Application Data

(63) Continuation of application No. 11/688,498, filed on Mar. 20, 2007, now abandoned.

(60) Provisional application No. 60/790,463, filed on Apr. 7, 2006.

(30) Foreign Application Priority Data

Apr. 7, 2006 (DE) .......................... 10 2006 016 509

(51) Int. Cl.
*B64D 11/00* (2006.01)
(52) U.S. Cl. ................. 244/118.5; 403/322.3; 403/322.4
(58) Field of Classification Search .................. 403/321, 403/322.1, 322.3, 322.4, 325, 326, 327, 353, 403/49; 244/118.5, 118.6
See application file for complete search history.

(56) References Cited

U.S. PATENT DOCUMENTS

| | | | |
|---|---|---|---|
| 2,909,352 A | 10/1959 | Van Buren, Jr. | 248/239 |
| 3,462,179 A * | 8/1969 | Hinkle | 403/353 |
| 4,258,940 A * | 3/1981 | Fudge | 403/353 |
| 4,715,409 A * | 12/1987 | Graf | 139/88 |
| 5,108,048 A | 4/1992 | Chang | 244/118.1 |
| 5,188,539 A * | 2/1993 | Langdon | 439/341 |
| 5,497,835 A * | 3/1996 | Laubner et al. | 172/272 |
| 5,518,040 A * | 5/1996 | Rupflin | 403/325 |
| 5,549,258 A | 8/1996 | Hart et al. | 244/118.1 |
| 5,716,027 A | 2/1998 | Hart et al. | 244/118.1 |
| 5,842,668 A | 12/1998 | Spencer | 244/118.1 |
| 5,938,149 A | 8/1999 | Terwesten | 244/118.5 |
| 6,318,671 B1 | 11/2001 | Schumacher et al. | 244/118.5 |
| 6,769,831 B2 | 8/2004 | Aquino et al. | 403/350 |
| 6,874,731 B1 | 4/2005 | Brauer et al. | 244/118.5 |

(Continued)

FOREIGN PATENT DOCUMENTS

DE 199 37 569 4/2001

(Continued)

*Primary Examiner* — Michael P Ferguson
(74) *Attorney, Agent, or Firm* — Ingrassia Fisher & Lorenz P.C.

(57) ABSTRACT

The present application describes a quick-change fastening system for demountably mounting an element to a fastening structure. The element comprises an engagement element that is designed to engage a bearing element of the fastening structure, wherein the element is hingeably held around the bearing element between a hooked-in position and a fastened position. The element further comprises a fastening element that can be affixed to a locking element of the fastening structure when the element is in its fastened position. The engagement element and the bearing element are designed such that along a hingeing movement of the element a form-fit connection is established when the element is in its hooked-in position, and that a force-fit connection is established when the element is in its fastened position.

12 Claims, 5 Drawing Sheets

U.S. PATENT DOCUMENTS

| | | | |
|---|---|---|---|
| 6,883,753 B1 | 4/2005 | Scown | 244/118.1 |
| 7,156,345 B2 | 1/2007 | Brauer et al. | 244/118.6 |
| 7,232,095 B2 | 6/2007 | Park et al. | 244/118.6 |
| 7,309,045 B2 | 12/2007 | Melberg et al. | 244/118.5 |
| 2006/0049310 A1 | 3/2006 | Park et al. | 244/118.5 |
| 2007/0084966 A1* | 4/2007 | Haynes et al. | 244/118.1 |

FOREIGN PATENT DOCUMENTS

| | | |
|---|---|---|
| EP | 0 514 957 | 11/1992 |
| EP | 0 861 781 | 9/1998 |
| WO | WO 96/14243 | 5/1996 |

* cited by examiner

QUICK-CHANGE FASTENING SYSTEM FOR MOUNTING AN ELEMENT TO A FASTENING STRUCTURE

CROSS-REFERENCE TO RELATED APPLICATION(S)

The present application is a continuation under 37 C.F.R. §1.53(b) of prior U.S. patent application Ser. No. 11/688,498, filed Mar. 20, 2007, by Marc PEIN et al. entitled QUICK-CHANGE FASTENING SYSTEM FOR MOUNTING AN ELEMENT TO A FASTENING STRUCTURE, which in turn, claims the benefit of German Patent Application No. 10 2006 016 509.8 filed Apr. 7, 2006 and of U.S. Provisional Patent Application No. 60/790,463 filed Apr. 7, 2006, the disclosures of which are hereby incorporated herein by reference.

FIELD OF THE INVENTION

The invention relates to an element, in particular a container to receive objects, comprising a fastening device for detachably mounting the element to a fastening structure.

The invention further relates to a fastening structure for detachably mounting an element, in particular a container, to receive objects. The container is, for example, an overhead stowage compartment or hatrack for passenger cabins of a means of locomotion for transporting passengers.

Furthermore, the present invention relates to a fastening system that comprises an element as mentioned above, as well as a fastening structure as mentioned above.

Moreover, the invention relates to a means of locomotion, in particular an aircraft, which comprises a fastening structure of the type mentioned.

BACKGROUND OF THE INVENTION

Efficient and economical operation of modern passenger aircraft makes it necessary for the aircraft operators concerned to be in a position to flexibly react to any fluctuations in passenger bookings. This means that changes in the layout of an aircraft cabin must be able to be carried out within a short period of time. During such changes in layout, for example the interior architecture of seats, galleys, overhead stowage compartments and other installations is changed. A change in layout can, for example, involve expanding business class at the expense of economy class so that as a result of this more business class passengers but fewer economy class passengers can be transported. The time required to carry out such a change in the layout of an aircraft cabin should not exceed a few hours. Furthermore, it should be possible to carry out such a change with as few installation personnel as possible.

For example, expanding business class at the expense of economy class involves, among other things, the expansion, installation and altering of the arrangement of seats, galleys and overhead stowage compartments (OHSCs), also referred to as hatracks, installed on the ceiling in the middle of the passenger cabin. Normally, with such alteration of the arrangement of the passenger cabin, deinstallation or installation of such OHSCs is a particularly time-intensive part of the layout change.

From U.S. Pat. No. 6,883,753, an installation system for overhead stowage compartments for attaching the latter to a ceiling structure of an aircraft cabin is known. In order to achieve stable fastening of the overhead stowage compartments, the installation system is able to introduce forces, which can, for example, arise during turbulent flight phases, along any spatial direction into the aircraft structure. In this context the term "aircraft structure" relates to the fuselage, which involves a lightweight design comprising frames and stringers. The term "frames" refers to fuselage stiffeners that extend so as to be perpendicular to the longitudinal direction of the fuselage. The term "stringers" refers to longitudinal stiffeners of the fuselage. In order to introduce all the possibly occurring forces into the aircraft structure it is thus necessary for the components of the installation system to precisely match the aircraft structure. This means that the installation system and thus also the overhead stowage compartments have to be installed so as to tie in with the frame spacing of the fuselage.

From EP 861781A1 a baggage stowage arrangement is known which makes possible fast conversion of an aircraft between a layout that is optimised for the transport of passengers and a layout that is optimised for the transport of freight. Fast exchange of overhead stowage compartments is achieved in that the corresponding stowage containers, for the purpose of being fastened to the ceiling structure of an aircraft cabin, are first laterally hooked into corresponding eyelets, and are then moved to their fastened position by means of a hinge movement.

From EP 514957 A1 a removable stowage compartment system is also known that makes possible a rapid change from a freight layout to a passenger layout and vice versa. In this arrangement the corresponding overhead stowage compartments are horizontally inserted into a rail system. The system is designed such that when the stowage compartment is slid in, a mechanism ensures that the stowage compartment clicks into place and is fastened in its end position.

From U.S. Pat. No. 5,549,258 an installation system is known which makes it possible to change stowage compartments of different but mutually compatible sizes. In this arrangement larger stowage compartments fit into the same retaining structures that are also provided for smaller stowage compartments.

From U.S. Pat. No. 5,108,048 a stowage compartment system is known that comprises panels which serve as a connecting link between the cabin structure and the overhead stowage compartments. In this arrangement the panels are characterised by fastening properties, which in other designs are provided by the cabin structure.

SUMMARY OF THE INVENTION

It is an object of the present invention to provide an improved fastening system for elements, in particular for containers, to receive objects, which fastening system makes possible simple and rapid installation of the elements on a cabin structure of a passenger compartment and/or transport compartment.

This object is met by an element, comprising a fastening device for detachably mounting the element to a fastening structure, wherein the fastening device .0..0.3 comprises an engagement element that is designed to engage a bearing element of the fastening structure so that the element is hingeably held around the bearing element between a hooked-in position and a fastened position. The fastening device further comprises a fastening element that can be affixed to a locking element of the fastening structure when the element is in its fastened position. In the element described, the engagement element is designed such that said engagement element, together with the bearing element, along a hingeing movement of the element, forms a form-fit connection when the element is in its hooked-in position, and the engagement element, together with the bearing element, forms a force-fit connection when the element is in its fastened position.

The above-mentioned element is based on the recognition that with a suitable physical design of the engagement element in the case of a complete hingeing movement between the hooked-in position and the fastened position it is not only possible to achieve affixation of the fastening element to the locking element, but also to achieve a force-fit connection between the engagement element and the bearing element. This provides an advantage in that stable fastening of the element can be achieved by means of a simple movement sequence. In this way the number of work steps and thus also the number of personnel required for installing and deinstalling elements on/from a fastening structure that is designed in a suitable manner can be reduced.

The fastening process of such an element can roughly be divided into two phases. In the first phase the element is hung on one side into the bearing element. In the second phase the element is hinged into the fastened position, wherein the position serves as a hinge center at which position the engagement element rests against the bearing element.

In known fastening systems a container is at the same time coupled to a fastening structure at least in two positions that are spaced apart from each other. In contrast to this the two-phase fastening process is associated with an advantage in that it does not require any auxiliary constructions such as, for example, lift trolleys, for installing the described element.

According to one exemplary embodiment of the invention, the engagement element is a hook. In this way a suitable engagement element can be produced in a particularly simple and economical manner so that no elaborate and expensive components are required to provide the element.

According to a further exemplary embodiment of the invention, the cross section of the hook tapers off continuously in the direction towards the front end of the hook. This can most easily be achieved in that the outer delimitation of the hook does not have a constant curvature, but instead has a continuously changing curvature. In this way the respective radius of curvature of the exterior region continuously diminishes in the direction to the front end of the hook. A curvature that merely changes continuously is associated with an advantage in that the outer delimitation of the hook has a smooth surface that is free of any corners and edges. This means that unintended tilting of the hook at or in the bearing element is precluded at least as long as the element is not yet in the fastened position.

According to a further exemplary embodiment of the invention, the engagement element comprises a mechanical cushioning element for reducing mechanical stress between the engagement element and the bearing element. This provides an advantage in that such stress, which may lead to a reduction in the service life of the connection system comprising the engagement element and the bearing element can be significantly reduced. Such tension can occur in particular when the element is in the fastened position.

It should be noted that such mechanical cushioning elements, also known as shock mounts, do not just reduce mechanical tension. Such shock mounts can, in particular, result in a reduction in vibration transferred during flight operation, or to a reduction in vibration that may occur during a hingeing movement.

According to a further exemplary embodiment of the invention, the fastening element is designed such that it can be made to lock into place in the locking element. This provides an advantage in that at the end of the swivel movement automatic locking into place occurs when the element is brought into the fastened position. There is thus no further manual operating step required in order to safely fasten the element after the end of the hingeing movement.

According to a further exemplary embodiment of the invention, the fastening element is a bolt, which for the purpose of locking into place engages the locking element. This provides an advantage in that the fastening element can not only be produced in a simple manner but can also feature considerable mechanical strength.

Of course the bolt is not purely cylindrical or cuboid in shape. Instead, for locking into the locking element, the bolt needs to comprise a type of indentation that comprises a recess or a projection. In this way a snap-in web of the locking element can automatically lock into place into a snap-in notch or into a snap-in lug of the bolt.

It should be pointed out that an inverted configuration is also possible in which the locking element is a bolt that engages the fastening element.

According to a further exemplary embodiment of the invention, the element additionally comprises a releasing mechanism for the intended release of the affixation between the fastening element and the locking element. In this way deinstallation of the element can be implemented in a simple manner so that deinstallation of an element can also be carried out with only a few manual steps.

According to a further exemplary embodiment of the invention, the releasing mechanism is a remote releasing mechanism. This can provide an advantage in that undoing the connection between the fastening element and the locking element is possible without the need for an operator having to intervene directly in the connection between the fastening element and the locking element. Instead, by means of a remote releasing mechanism a situation can be achieved where undoing the affixation between the fastening element and the locking element can be carried out by one operator in an ergonomically advantageous position without postural strain, wherein, for example, the hand that operates the releasing mechanism can at the same time hold the element.

A remote releasing mechanism can be implemented in various ways. For example, remote release can take place electrically with the use of a magnetic final control element.

According to a further exemplary embodiment of the invention, the remote releasing mechanism comprises a mechanical wire connection. This is associated with an advantage in that the remote releasing mechanism can be implemented in a simple manner, in a malfunction-resistant manner and independently of any external power supply. With suitable routing of the wire connection it is furthermore possible to achieve convenient release of the affixation without a corresponding operator having to assume an ergonomically unfavourable position.

The wire connection can be implemented by means of a Bowden wire, which because of its enclosure of the actual wire connection provides good malfunction resistance.

According to a further exemplary embodiment of the invention, the releasing mechanism comprises an actuating device and a releasing element. The actuating device can, for example, be a toggle switch. The releasing element is, for example, a pin, which engages the locking element in a suitable manner and which by sliding or tilting causes elastically pre-tensioned clamping jaws to release from the fastening element.

According to a further exemplary embodiment of the invention, the element additionally comprises a system connection for coupling the element to external system components of a means of locomotion. In this context the term "external" refers to corresponding system components that are outside the element. System components in an aircraft include, for example, components of an air conditioning system, of a power supply system, or of a data processing system, which may contribute to enhanced passenger comfort. Depending on the requirements, the coupling can take place electrically and/or optically.

According to a further exemplary embodiment of the invention, the system connection comprises a rapid-action coupling. This provides an advantage in that both installation and deinstallation of the element is not slowed down, or only insignificantly slowed down, as a result of the required coupling or uncoupling of system components.

According to a further exemplary embodiment of the invention, the system connection is arranged such that said system connection is easily accessible if the element is in its fastened position. In this way simple coupling and decoupling during installation or deinstallation of the element can take place. In this arrangement the system connection can be arranged such that it is hidden behind the element when the element is in the fastened position. Thus it is possible in an advantageous and simple manner to prevent accidental or even intended manipulation of the system connection.

According to a further exemplary embodiment of the invention, several system connections are taken together in a single interface. This makes it possible in an advantageous manner for several system connections to be able to be coupled or decoupled at the same time in a single manual step.

The interface can be implemented in a standardised form so that various elements can form a modular system in which in a simple manner an element of a first type can be exchanged for an element of a second type. The interface can be implemented in the form of a so-called docking station so that coupling or decoupling can take place in a single manual step. Furthermore, a docking station can be designed such that any inadvertent incorrect connection of system components is impossible. In this way the fail-safe-principle can be implemented.

According to a further exemplary embodiment of the invention, the element is an overhead stowage compartment or a hatrack. In particular, the element is an overhead stowage compartment that can be affixed in the centre of the passenger cabin of an aircraft. This provides an advantage in that a particularly fast conversion of the interior layout of a passenger aircraft is possible. It should be pointed out that the overhead stowage compartment can not only be an overhead stowage compartment that is arranged in the middle, but also an overhead stowage compartment that can be arranged laterally at the edge of the passenger cabin.

According to a further exemplary embodiment of the invention, the element additionally comprises a further engagement element that is designed to engage a further bearing element of the fastening structure. Furthermore, the element comprises a further fastening element that can be affixed to a further locking element of the fastening structure when the element is in its fastened position. This provides an advantage in that the point of support between the engagement element and the bearing element on the one side, and a further point of support between the further engagement element and the further bearing element on the other side define a hinge axis so that, after hooking the two engagement elements on both sides into the two bearing elements, inadvertent lateral tilting of the element out of the hingeing plane is no longer possible. Particularly good stability against tilting can be achieved in that the engagement elements or the fastening elements are arranged in close proximity to the corners, or at least in close proximity to lateral delimitations of an element that is essentially cuboid in shape.

In this embodiment there are thus a total of four installation points for the element so that particularly stable fastening of the element to the cabin structure of an aircraft is possible.

According to a further exemplary embodiment of the invention, the further engagement element is designed such that, together with the further bearing element, it forms a form-fit connection along a hingeing movement of the element when the element is in the hooked-in position, and in that together with the further bearing element said further engagement element forms a force-fit connection when the element is in its fastened position. The further force-fit connection between the further engagement element and the further bearing element can contribute to a significant increase in the stability of the fastening arrangement of the element.

It should be pointed out that also the further engagement element can be designed so as to be identical to the engagement element. This means that all the above-described embodiments, by which advantageous embodiments of the engagement element are described, also apply to the further engagement element. The same also applies to the further fastening element that can be implemented in all the embodiments that are described above in relation to the fastening element.

According to a further exemplary embodiment of the invention, along an x-direction parallel to a connection line between the engagement element and the further engagement element the connection between the engagement element and the bearing element is designed as a fixed bearing, while the connection between the further engagement element and the further bearing element is designed as a movable bearing. This is associated with an advantage in that the element is arranged, along the x-direction, in a precise spatial position already during the hingeing movement so that a particularly precisely defined hingeing movement can be ensured.

In order to make it possible to easily insert the two engagement elements into the two bearing elements, the bearing element that contributes to the fixed bearing can comprise oblique interfaces so that when the engagement element is hooked into the bearing element the engagement element automatically slides into the position that has been precisely defined in relation to the x-direction. It is thus possible to prevent a situation in which the fixed bearing makes it difficult to hook the element into the fastening structure.

The object of the invention is further met by a fastening structure for detachably mounting an element. The element is in particular a container for accommodating objects. The fastening structure comprises a bearing element that can be made to engage an engagement element of the element so that the element around the bearing element is hingeably held between a hooked-in position and a fastened position. The fastening structure further comprises a locking element to which a fastening element of the element can be fixed when the element is in the fastened position. In this arrangement the bearing element of the described fastening structure is designed such that the bearing element, together with the engagement element, forms a form-fit connection along a hingeing movement of the element when the element is in its hooked-in position, and that the bearing element, together with the engagement element, forms a force-fit connection when the element is in its fastened position.

The above-mentioned fastening structure is based on the cognition that a hingeing movement in which the element is brought to a fastened position can be combined or synchronised with a clamping process. This is possible when the bearing element is suitably designed so that during the hingeing movement a form-fit connection along a hingeing movement of the element is transformed into a force-fit connection between the bearing element and the engagement element.

According to a further exemplary embodiment of the invention, the bearing element comprises a bearing bolt into which an engagement element in the shape of a hook can be hooked. In this way a particularly simple and robust type of rotary bearing can be implemented.

According to a further exemplary embodiment of the invention, the bearing bolt is designed in the form of a cylinder, which, parallel to its longitudinal axis, on one side comprises a bevel. With a bevel, designed in a suitable manner such that along the longitudinal axis of the cylinder at the outside wall of the cylinder a certain removal of material takes place, a particularly simple hooking-in of the element to the fastening structure can be achieved without there being a need for any jamming between the bearing element and the engagement element.

According to a further exemplary embodiment of the invention, the bearing element comprises a mechanical cushioning element to reduce mechanical tension between the engagement element and the bearing element. Such mechanical cushioning elements, also known as shock mounts, not only reduce the described mechanical tension, but instead contribute to a reduction in undesirable vibration that can occur during a hingeing movement.

According to a further exemplary embodiment of the invention, the locking element is designed such that the fastening element can be locked into the locking element. In this way it is possible in an advantageous manner to achieve automatic snapping-in, and thus automatic and complete locking of the element to the fastening structure when at the end of a corresponding hingeing movement the element reaches the fastened position.

According to a further exemplary embodiment of the invention, the locking element comprises a snap-in web, which snaps into a notch or a recess of the fastening element. In this arrangement the snap-in web can be made from an elastic material so that the locking element can be produced with only a few mechanical components. Likewise, the snap-in web can also be pushed or pulled into a preferred position by means of a spring that has been built into the locking element in a suitable manner. In this arrangement the snap-in web can be held so as to be movable, for example by means of a slide, within the locking element.

According to a further exemplary embodiment of the invention, the locking element is designed such that it can be released with the use of a releasing mechanism. In an advantageous manner this can make possible particularly easy deinstallation of the element.

According to a further exemplary embodiment of the invention, the bearing element and/or the locking element are/is fastened, by means of a multiple support, to a chassis of the means of locomotion. In this arrangement the multiple support preferably comprises a sufficient number of support elements such that there to remain no degrees of freedom of movement for the corresponding elements. Thus, for example with the use of three support elements that affix the corresponding elements along different directions, a situation can be achieved where there are no longer any degrees of freedom of movement for the corresponding elements. In this way a spatially unchanged relative position between the chassis and the bearing element and/or the locking element is ensured.

In the case of a fuselage with stays that extend along the longitudinal axis of the fuselage (so-called stringers), and with stays that extend around the fuselage so as to be perpendicular to the longitudinal axis (so-called frames), a particularly stable mechanical connection of the corresponding elements to the fuselage structure can be achieved. In this arrangement the multiple support acts for example on various frames so that the introduction of force is not only onto the frames but also onto the stringers that interconnect the frames.

By leading the multiple support to a single element (bearing element and/or locking element) a reduction in the number of installation points required for a stable fastening of the element to the fastening structure can be achieved.

According to a further exemplary embodiment of the invention, the fastening structure additionally comprises a further bearing element that can be made to engage a further engagement element of the element. Furthermore, the fastening structure comprises a further locking element to which a further fastening element of the element can be affixed when the element is in its fastened position. As has already been explained above, the point of support between the engagement element and the bearing element on the one hand, and the further point of support between the further engagement element and the further bearing element define a hingeing axis so that lateral tilting of the element from the hingeing plane is no longer possible. Particularly good stability against tilting can be achieved in that the two bearing elements or the two locking elements are arranged on the element at the widest possible spacing.

According to a further exemplary embodiment of the invention, the further bearing element is designed such that the further bearing element, together with the further engagement element, form a form-fit connection along a hingeing movement of the element when the element is in its hooked-in position. Moreover, the further bearing element is designed such that the further bearing element, together with the further engagement element, form a force-fit connection when the element is in its fastened position.

At this stage it should be pointed out that the further bearing element too can be designed so as to be identical to the bearing element explained above, in all its described embodiments.

According to a further exemplary embodiment of the invention, along an x-direction parallel to a connection line between the bearing element and the further bearing element the connection between the bearing element and the engagement element is designed as a fixed bearing, while the connection between the further bearing element and the further engagement element is designed as a movable bearing. This makes possible a mechanical hingeing movement free of any jamming even if the spacing between individual components of the fastening structure changes, for example by thermal expansion along the x-direction. Furthermore, stable affixation of the element along the x-direction both during and after the hingeing movement is also achieved.

According to a further exemplary embodiment of the invention, the locking element comprises an opening for inserting the fastening element. Furthermore, the further locking element comprises a further opening for introducing the further fastening element, wherein the further opening is larger than the opening. This makes possible in an advantageous manner reliable hingeing-in of the element, without any jamming, into the fastened position provided that in a suitable manner the spatial dimensions of the two openings are selected such that on the side of the locking elements, too, the asymmetry between the two bearing elements arranged on the opposite side is taken into account, which asymmetry on the side of the bearing element provides a fixed bearing, while on the side of the further bearing element provides a movable bearing.

According to a further exemplary embodiment of the invention, the fastening structure additionally comprises a bearing block that comprises two bearing elements. In this arrangement a first bearing element is associated with an engagement element of a first element, and a second bearing element is associated with a further engagement element of a second element. Furthermore, the fastening structure comprises at least one locking block that comprises two locking elements, wherein a first locking element is associated with a fastening element of a first element, and a second locking element is associated with a further fastening element of a second element.

A fastening structure formed in such a manner makes it possible in a compact manner to mount a multitude of elements that are preferably arranged directly side-by-side in a row. In this arrangement the first bearing element and the second bearing element can be designed like the bearing element of which some embodiments have been explained above.

As a result of a modular design of the elements a particularly easy and quick exchange between various elements can be made possible. This results in considerable cost savings when changing the layout of a passenger compartment of an aircraft, because the usual downtimes are not prolonged, or are prolonged only slightly, as a result of the change in layout.

It should be pointed out that not only in the embodiment presently described, but also in the embodiments described above, various changes in the layout can be implemented more quickly. Accordingly, a change in layout does not just refer to two different passenger cabin configurations but also to a change from a passenger cabin to a cargo space or from a cargo space to a passenger cabin.

The object on which the present invention is based is further met by a fastening system that comprises an element as well as a fastening structure. In this arrangement the element and the fastening structure can be designed according to any one of the embodiments described above.

The object on which the present invention is based is further met by a means of locomotion, in particular an aircraft, which comprises a fastening structure that is designed according to any one of the embodiments described above.

According to an exemplary embodiment of the invention, the means of locomotion is an aircraft, in particular a passenger aircraft. In view of the strong competition between airlines, in the case of a passenger aircraft it is particularly important that the interior layout of an aircraft can optimally be matched to the particular passenger demand. In this context, the ability to quickly change the layout of a passenger cabin contributes to a modern passenger aircraft being able to be quickly and flexibly adapted to different passenger bookings.

BRIEF DESCRIPTION OF THE DRAWINGS

Further advantages and characteristics of the present invention result from the following exemplary description of presently preferred exemplary embodiments. The drawing shows the following diagrammatic illustrations.

DESCRIPTION OF PREFERRED EMBODIMENTS OF THE INVENTION

Figure 1:
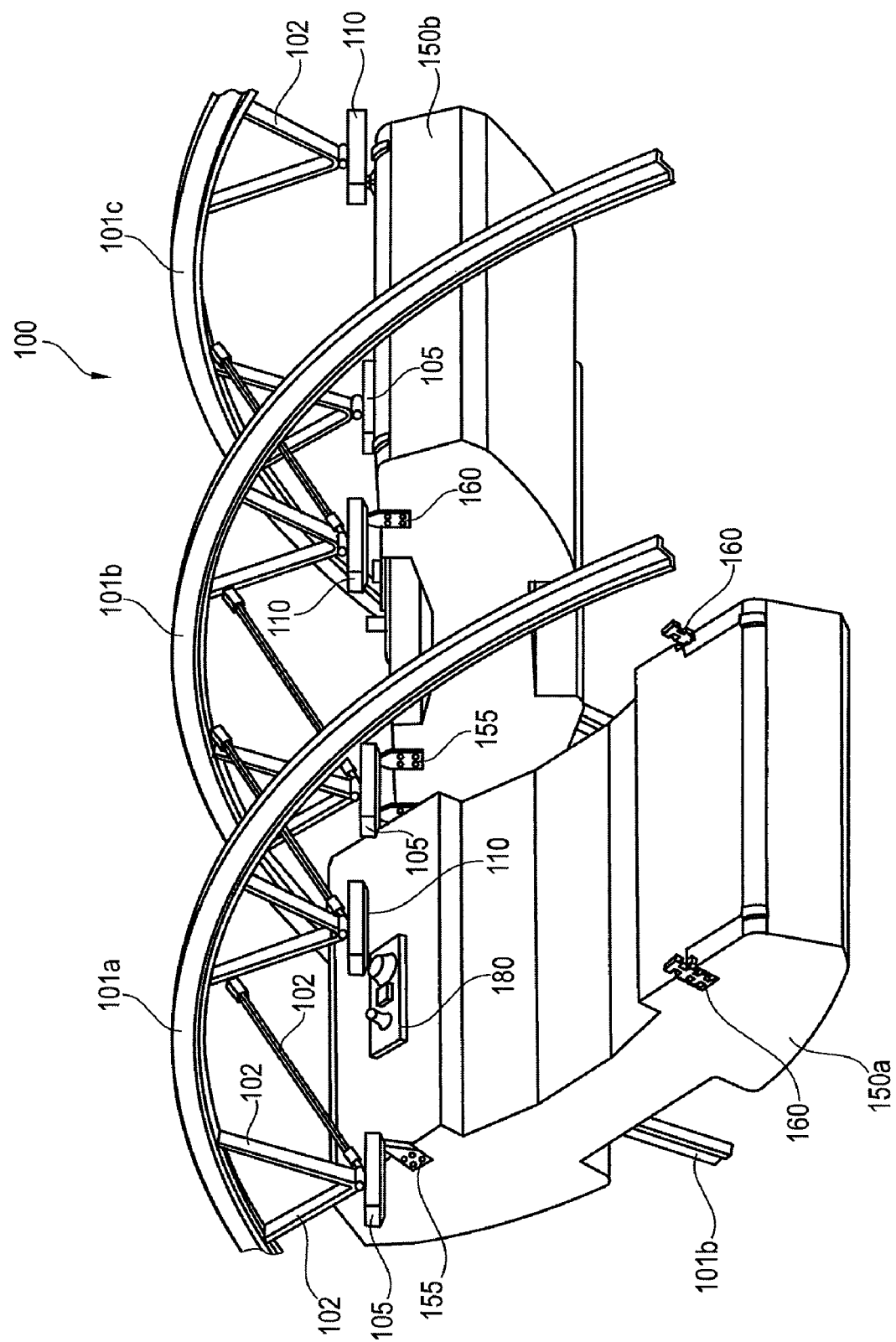
FIG. 1 shows a connection between overhead stowage compartments to a ceiling construction of a passenger aircraft.

At this point it should be noted that in the drawings, reference characters of identical or corresponding components differ only by their first numeral and/or by an appended letter.

FIG. 1 shows a principal arrangement for a ceiling construction 100 of a passenger aircraft according to one exemplary embodiment of the invention. The ceiling construction 100 is affixed to the fuselage of the passenger aircraft. The fuselage is constructed in a lightweight design and comprises frames 101a, 101b and 101c as well as stringers (not shown). The frames 101a, 101b and 101c are enclosed by the external skin (not shown) of the aircraft. The shown ceiling construction 100 comprises centre hatracks 150a, 150b, wherein the hatrack 150a is shown in its hooked-in state, while the hatrack 150b is shown in its installed state.

Each of the overhead stowage compartments 150a and 150b is held by two bearing elements 105 and two locking elements 110, which are connected to the fuselage by way of stays 102. In this arrangement each bearing element 105 or each locking element 110 is fastened to the fuselage by means of three stays 102. In this arrangement each element is connected, by way of the stays 102, to at least two different frames 101a, 101b, 101c. The bearing elements 105 and the locking elements 110 are thus arranged in a fixed position relative to the fuselage, in this way acting as loadable fitting elements that can transfer forces to the fuselage not only perpendicularly in relation to the longitudinal axis of the aircraft, but also in the direction of the longitudinal axis of the aircraft.

The two overhead stowage compartments 150a, 150b are designed with identical spatial dimensions so that the arrangement shown of elements 150a, 150b arranged in the middle of an aircraft cabin represents a modular system. In this way different elements, which however have identical external dimensions, can be interchanged without major effort.

As can in particular be recognised in the case of element 150a, the elements 150a, 150b comprise engagement elements 155 on the rear, which engagement elements 155 are designed as hooks. In this way, in the case of installation on the ceiling construction 100 of the aircraft, the elements 150a, 150b can easily be hooked into the corresponding bearing elements 105. The element 150a is shown in such a hooked-in state. For final complete fastening, the corresponding element is then rotated on the so-called hook fitting until the fastening elements 160 snap into the corresponding locking elements 110. In this way the installation of an element 150a, 150b involves a two-stage installation process. In a first stage first the element 150a, 150b is hooked on one side into the corresponding bearing elements 105. In a second stage the element 150a, 150b is hinged to a fastened position, in which the fastening elements 160 engage the corresponding locking elements 110. The two-stage installation process can easily be carried out by a single operator without the need for any additional auxiliary means, for example lifting trolleys, in order to install the corresponding element 150a, 150b.

The element 150a shown in FIG. 1 further comprises an interface 180 that is designed as a docking station for system connections. System connections are used for coupling the element 150a to external system components of an aircraft, for example to an air conditioning system, a power supply system or a data processing system. Depending on the type of the corresponding system component, the system connections are pneumatic connection elements (for example for an air conditioning system), electrical connection elements (for example for a power supply system) or optical connection elements (for example for a data processing system).

Figure 2:
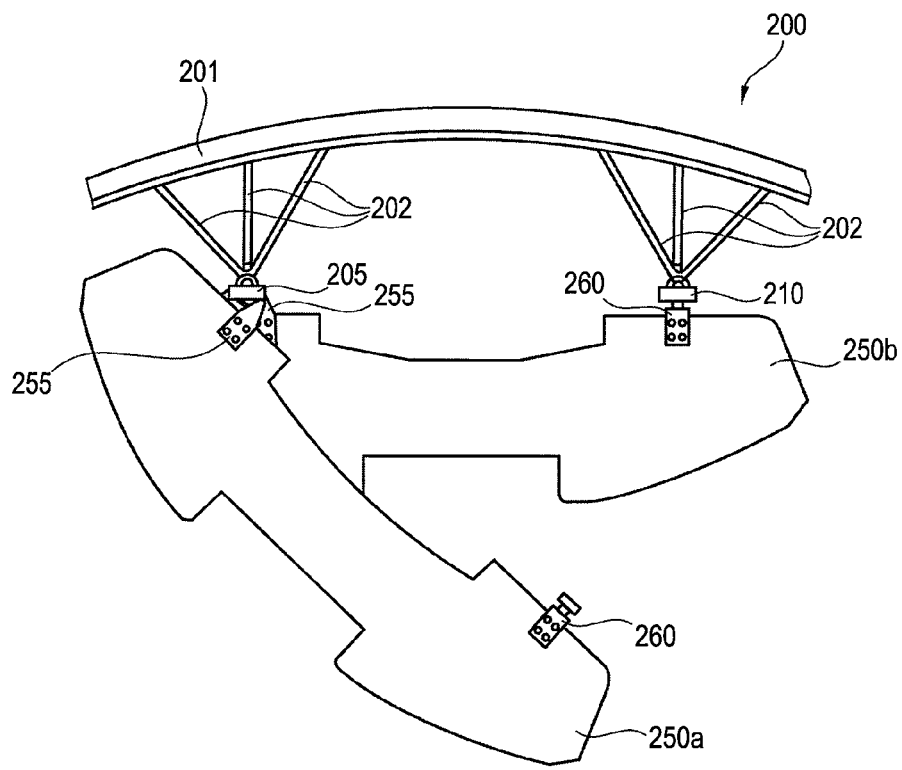
FIG. 2 shows a cross-sectional view of the connection of overhead stowage compartments by means of a hingeing movement.

FIG. 2 shows in a frontal view the elements shown in FIG. 1, wherein the elements are now designated with the reference characters 250a or 250b. The ceiling construction shown, now designated 200, shows a frame 201 of the fuselage as well as stays 202 to which bearing elements 205 or locking elements 210 have been fastened. The element 250a is shown in its hooked-in state, wherein the engagement elements 255, designed as hooks, engage the corresponding bearing elements 205. The element 205b is shown in its installed state or in its fastened position. In this arrangement the fastening elements 260 engage the corresponding locking elements 210. The fastening elements 260 are designed in the form of so-called pins, which comprise indentations for the purpose of reliable snapping-in into the locking elements 210. These indentations are clearly shown in the fastening element 260 of the front element 250a.

Figure 3:
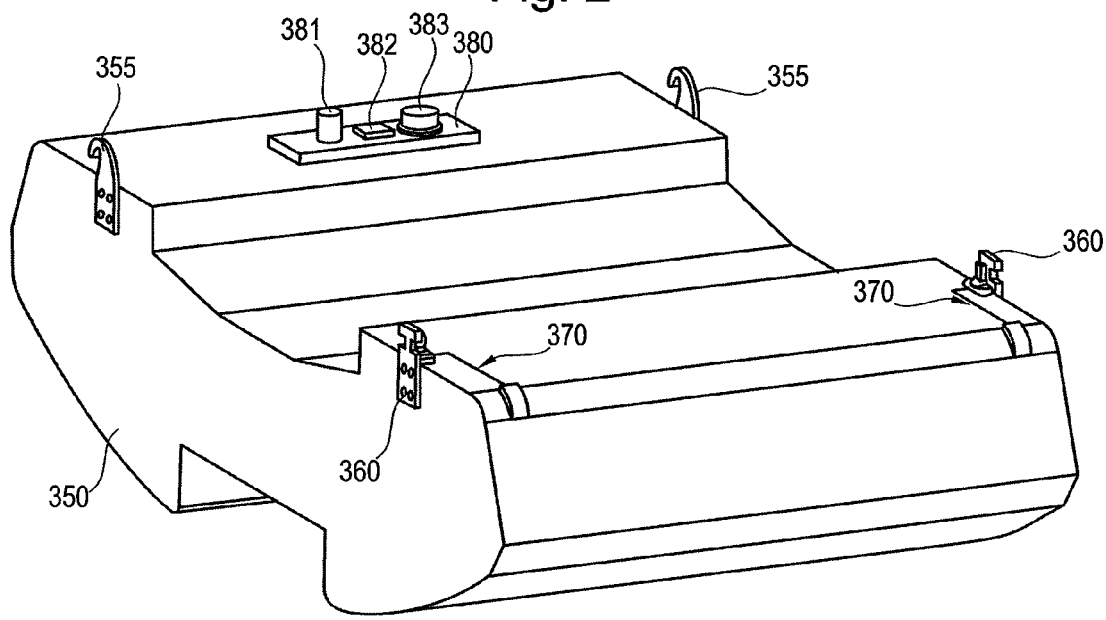
FIG. 3 shows an overhead stowage compartment with a docking station for various system connections.

FIG. 3 shows a single element 350 that comprises engagement elements 355 designed as hooks, as well as fastening elements 360 designed as bolts.

The element 350 further comprises a releasing mechanism 370 that makes it possible to easily deinstall an element fastened to a ceiling construction. In this arrangement the corresponding locking elements are adjusted to the effect that a snap-in mechanism is temporarily disengaged so that the corresponding fastening elements 360 are pulled from the respective locking element, and thus the element can be hinged from its fastened position to the so-called hook-in position. As has already been mentioned above, in the hooked-in position only the engagement elements 355 engage the corresponding bearing elements, so that the element hangs by one side from the ceiling construction.

Furthermore, the element 350 comprises a docking station 380. According to the exemplary embodiment shown, the docking station 380 comprises an electrical system connection 381, an optical system connection 382, as well as a pneumatic system connection 383. The docking station is a type of multiple socket that comprises various system connections, each of which is associated with a particular system component. In this way it is possible to effectively prevent connections that must not be interconnected from erroneously being interconnected. In this way during installation of the interior of an aircraft cabin it is possible to prevent erroneous incorrect connection of system components of the aircraft. Thus, when connecting the system components, a fail-safe-principle is implemented.

Bundling the system connections in a docking station and favourable positioning of the docking station on the side of the engagement elements 355 make it possible to quickly and simply install or deinstall the element 350. Preferably the system connections 381, 382 and 383 of the docking station 380 are so-called rapid-action couplings.

Figure 4A:
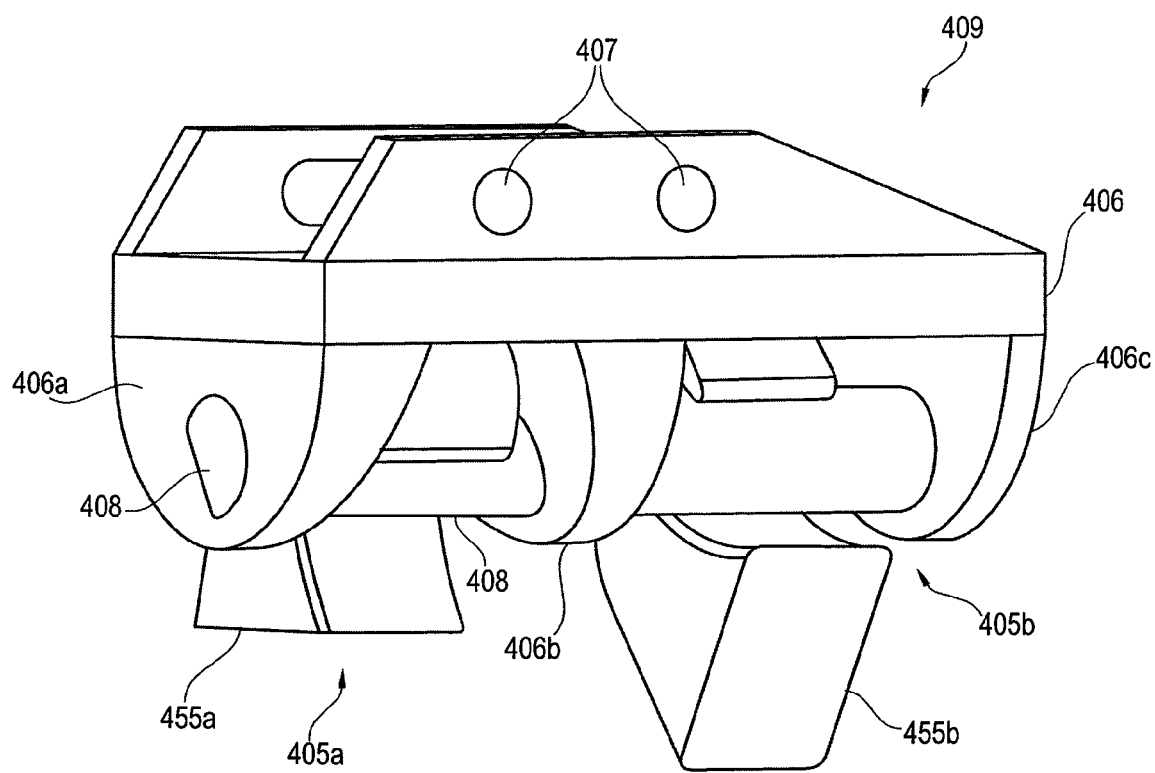
FIG. 4a shows an oblique view of a bearing block with two bearing elements for accommodating two engagement elements that are associated with different overhead stowage compartments.
Figure 4B:
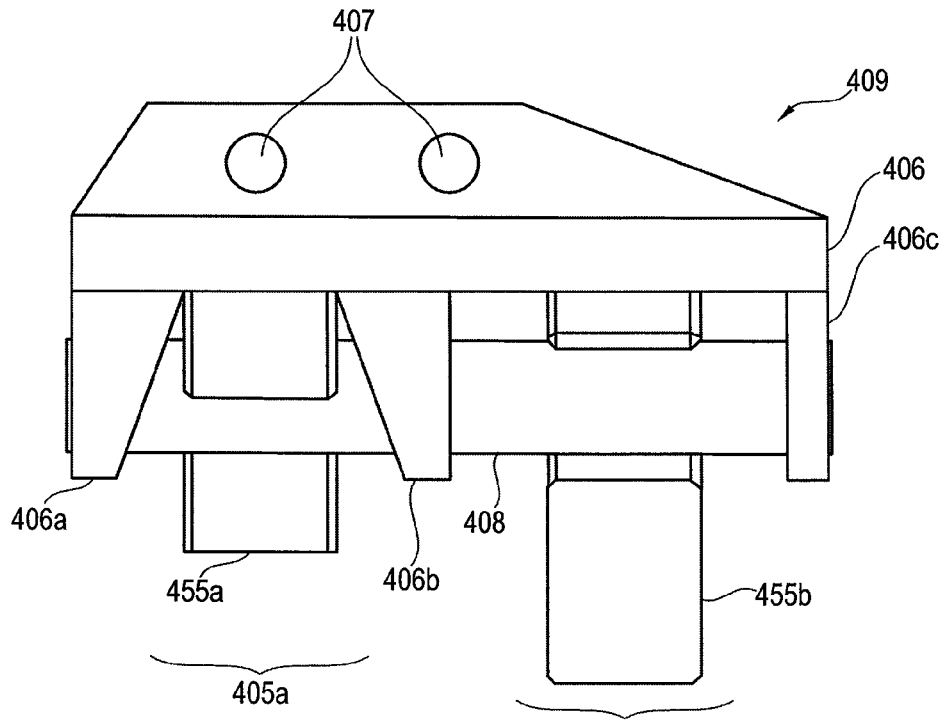
FIG. 4b shows a lateral view of the bearing block shown in FIG. 4.

FIGS. 4a and 4b show an enlarged view of a bearing block 409 that comprises two bearing elements 405a and 405b, arranged side-by-side. FIG. 4a shows an oblique view of the bearing block 409, while FIG. 4b shows a lateral view of said bearing block 409.

The bearing block 409 comprises a housing 406 that comprises three webs, namely an outer web 406a, a middle web 406b and a further outer web 406c. In each case there is a bearing bolt 408 between the web 406a and the web 406b, as well as between the web 406b and the web 406c, with an engagement element 455a or 455b being able to engage said webs. In this arrangement the engagement element 455a is associated with an overhead stowage compartment that is in its fastened positioned. The engagement element 455b is associated with an overhead stowage compartment (not shown), which is in its hooked-in state.

At its top the bearing block 409 further comprises two fastening bolts 407, which are used to attach the bearing block 409 by means of stays (not shown).

The bearing block 409 comprises the two bearing elements 405a and 405b. Since each of the engagement elements 355 is on a lateral wall of the element 350, the bearing block 409 is used to retain two elements that are arranged directly adjacent to each other. Of course, each of the elements requires a further bearing block that is arranged at a suitable position so that each element can be hooked into the ceiling construction by means of two engagement elements.

The engagement element 455a shown in FIGS. 4a and 4b is, for example, the left engagement element of a first overhead stowage compartment that is in its fastened position. The engagement element 455b is, for example, the right-hand engagement element of a second overhead stowage compartment that is in its hooked-in position.

Of course, in an analogous manner a locking block for accommodating the fastening elements 360 of the element 350 is also provided, which locking block in a corresponding manner comprises two locking elements. Such a locking block is described later with reference to FIG. 7.

As shown in particular in FIG. 4b, the engagement element 455a in conjunction with the bearing element 405a, or the engagement element 455b in conjunction with the bearing element 405b is designed such that between the engagement element and the bearing element there is a force-fit connection when the corresponding element is in its fastened position. In this arrangement the upper part of the hook-like engagement element 455a is jammed between the bearing bolt 408 and the housing plate 406. In contrast to this, the engagement element 455b in conjunction with the bearing element 405b provides a form-fit connection along a hingeing movement of the element. This means that between the top of the engagement element 455b and the underside of the housing plate 406 a gap remains so that in principle the engagement element 455b can slide in horizontal direction on the bearing bolt 408.

If during hingeing-in of the corresponding element the engagement element is rotated on the bearing bolt 408, then there is no longer a gap between the top of the engagement element 455a and the bottom of the housing plate 406, at least when the element concerned is in its fastened position. This means that the engagement element 455a is jammed between the bearing bolt 408 and the housing plate 406 so that based on this clamping action horizontal sliding of the engagement element 455a on the bearing bolt 408 is impossible. This means that both hooking-in and hingeing an element can be carried out without any major force. Furthermore, stable fastening of the element is ensured when the element concerned is in its fastened position.

As is furthermore shown in particular in FIG. 4b, in relation to a horizontal slide of the engagement elements 455 the bearing 405a is designed as a fixed bearing, while the bearing 405b is designed as a movable bearing. When taking into account a periodic arrangement of bearing blocks 409 in a corresponding ceiling construction of an aircraft, an engagement element of each element is thus fastened to a fixed bearing, while the other engagement element is fastened to a movable bearing. In order to ensure simple hanging-in of the elements, the webs 406a and 406b that delimit the fixed bearing 405a comprise inclined surfaces so that the engagement element 455a can be inserted into the fixed bearing 405a without any major adjustment work.

The combination comprising a fixed bearing and a movable bearing for the two engagement elements 355 provides an advantage in that simple hooking-in of the element 350 in two bearing blocks 409 is ensured. Furthermore, a clearly defined hingeing movement of the element 350 is ensured. In this arrangement the element 350 cannot slide in horizontal direction on the corresponding bearing bolts 408 so that the fastening elements 360 can snap precisely into corresponding locking elements.

The force-fit connection between the fastening element 455a and the bearing bolt 408 provides an advantage in that between the bearing block 409 and the corresponding element (not shown) forces that act against the weight forces can be transferred also in vertical direction. Such forces are, for example, encountered in the case of in-flight turbulence.

Furthermore, the connection between the engagement element 455a and the bearing element 405a can be supplemented by cushioning elements, also known as shock mounts, so as to reduce the loads of stays on the bearing block 409, as well as reducing loads on the structure of the fuselage.

Figure 5:
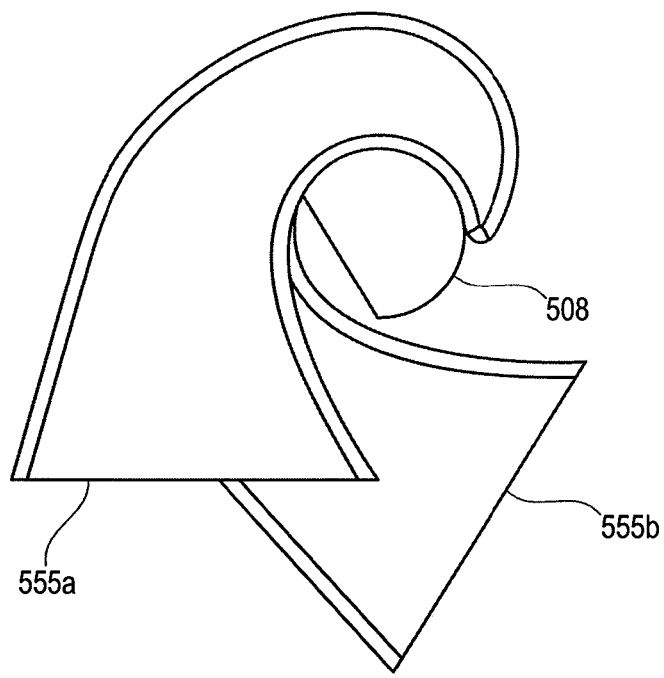
FIG. 5 shows a front view of two hooks that are held by a bearing bolt, wherein one hook is associated with an overhead stowage compartment that is in its hooked-in state, while another hook is associated with an overhead stowage compartment that is in its fastened state.

FIG. 5 shows two hook-shaped engagement elements 555a and 555b. The engagement element 555a is associated with an overhead stowage compartment, which is in its fastened position, i.e. in its fastened final state. The engagement element 555b is associated with an overhead stowage compartment that is in its hooked-in state. On one side the bearing bolt 508 comprises a bevel or a flat part so that hanging-in the engagement elements 555a or 555b becomes possible or is facilitated. In this arrangement the size relationships between the hook-shaped engagement elements and the bearing bolt 508 are selected such that it is made as easy as possible for an operator to hook the corresponding overhead stowage compartment into the ceiling construction of the passenger aircraft. Incorrect installation during hooking-in is thus almost impossible, or is immediately recognisable by a significantly skewed position of an incorrectly hooked-in overhead stowage compartment. In this way it can also be ensured that the overhead stowage compartment cannot slide out when said overhead stowage compartment is in its fastened position.

As has already been mentioned above, the engagement elements 555a and 555b, which are designed as hooks, are formed such that along a hingeing movement of the element a form-fit connection between the corresponding engagement element and the bearing element is formed when the corresponding element is in its hooked-in position. Provided the element is in its fastened position, the engagement element together with the bearing element forms a force-fit connection. As shown in FIG. 5, this connection, which depends on the respective hingeing angle of the corresponding element, is implemented in a simple manner in that the cross section of the engagement element gradually tapers off in the direction of the front end. According to the exemplary embodiment shown, this is implemented in that the external radius of the engagement element is gradually reduced in the direction towards the front end of the hook. When the engagement element 555a or 555b is rotated on the bearing bolt 508, the gap between said bearing bolt 508 and the housing plate (not shown in FIG. 5) becomes progressively narrower when the element is hinged in the direction towards the fastened position. When the element has reached the fastened position the gap has disappeared, and clamping action occurs between the engagement element and the bearing element, which clamping action contributes to particularly stable fastening of the corresponding element.

Figure 6:
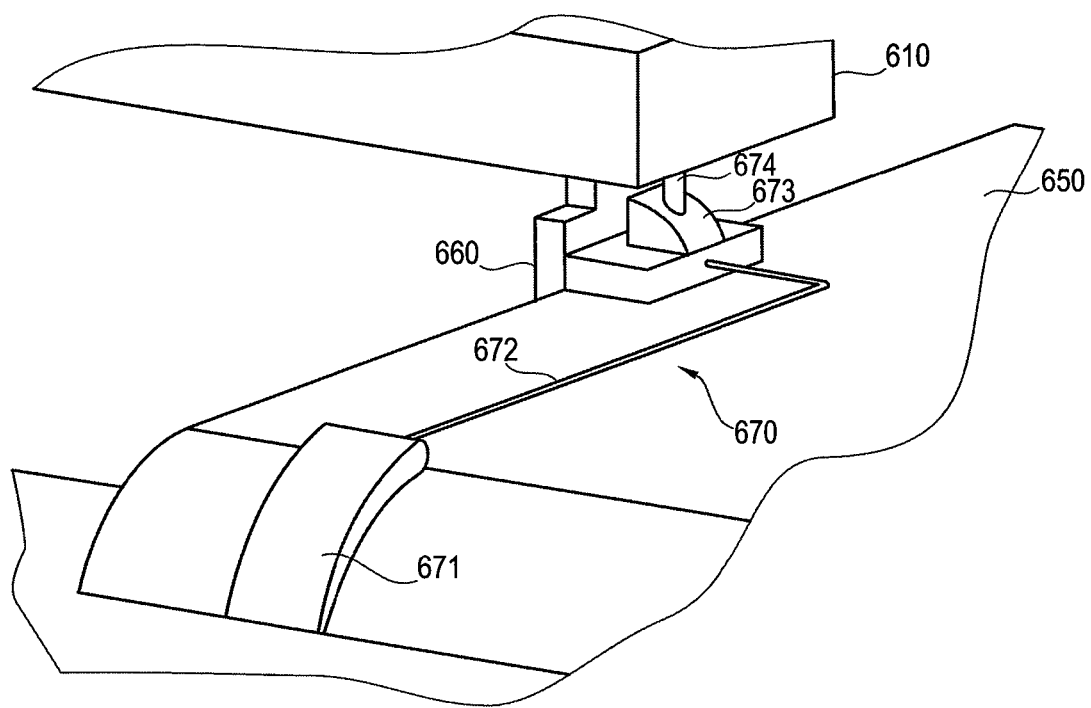
FIG. 6 shows a bolt of an overhead stowage compartment, which bolt is snapped into a locking element, wherein the locking element comprises a remote releasing mechanism.

FIG. 6 shows an enlarged view of the connection between a locking element 610 and a fastening element 660 of an overhead stowage compartment 650. The fastening element 660 is designed as a bolt. This bolt snaps into the locking element 110 when the element 650 is in its fastened position. In order to facilitate easy deinstallation of the element 650 from the corresponding ceiling construction, a remote releasing mechanism 670 is provided, which, when a toggle switch 671 is activated accordingly, leads to the opening-up of snap-in elements that hold the fastening element 660 in the locking element 610. Opening these snap-in elements when the operating device 671 is activated takes place by means of a wire connection 672, for example by means of a Bowden wire that is coupled to a releasing element 674 by way of a deflection mechanism 673. The releasing element 674 is a pin that engages the locking element 610 and opens a snap-in mechanism of the element 610 in a way not shown.

Figure 7:
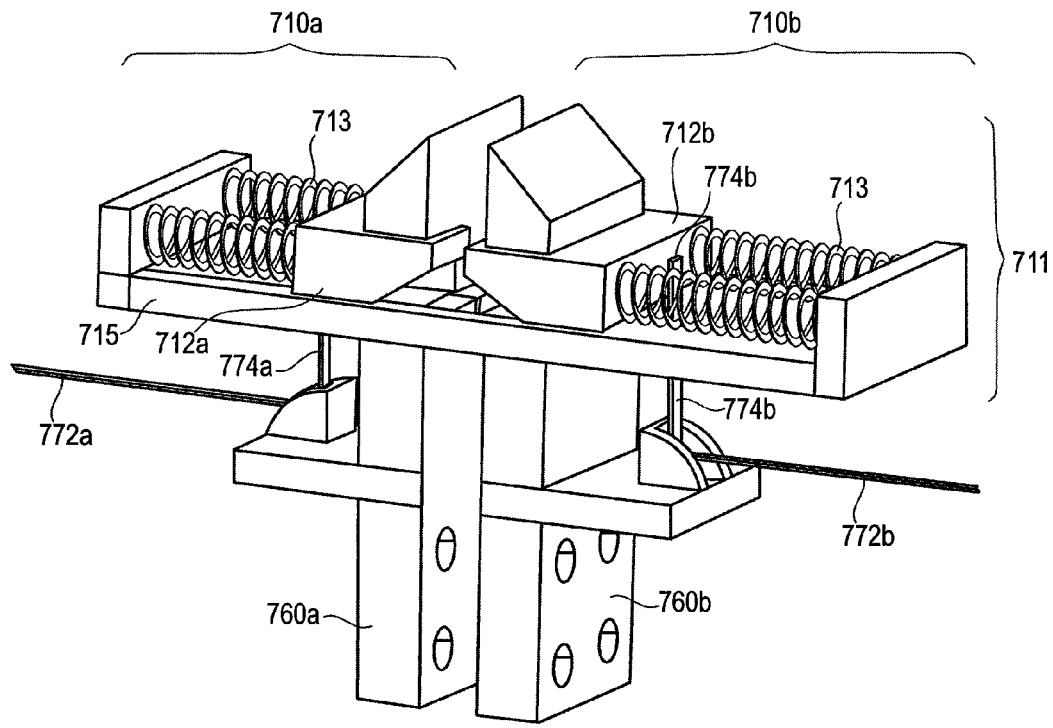
FIG. 7 shows a locking arrangement of two bolts by means of two snap-in webs, wherein the bolts are associated with different overhead stowage compartments.

FIG. 7 shows a locking block 711, which comprises two locking elements 710a and 710b. The locking element 710a comprises a snap-in web 712a that is pre-tensioned by way of springs. The locking element 710b comprises a snap-in web 712b, which is also pre-tensioned by way of springs.

The locking block 711 comprises a base plate 715 on which the two snap-in webs 712a and 712b are slidably held.

The top of the fastening element 760a is bevelled so that when the fastening element 760a is inserted into the locking element 710a the snap-in web 712a is temporarily moved to the left-hand side, against the spring force, until it snaps into corresponding openings of the fastening element 760 that are present on both sides of the fastening element 760a. The fastening element 760b is designed in an analogous manner so that automatic snapping-in of the fastening element 760b into the locking element 710b also takes place when a corresponding element is hinged into the fastening position.

In order to undo the snap-in connection, in each case a releasing element 774a or 774b is provided which from below engages the corresponding locking element 710a or 710b through an opening (not shown) in the base plate 715. With corresponding activation of a toggle switch (not shown), a Bowden wire 772a or 772b ensures that the releasing element 774a is hinged anticlockwise, or the releasing element 774b is hinged clockwise. In this way the snap-in web 712a or 712b is slid towards the left or the right so that the fastening element 760a or 760b can be removed downwards, out of the locking element 710a or 710b.

Figure 8:
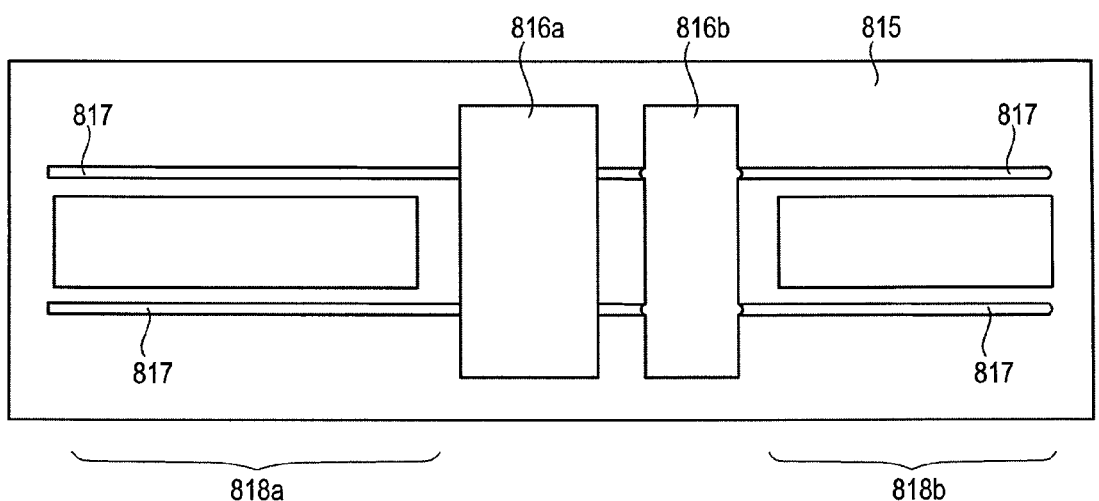
FIG. 8 shows a top view of the bottom of the locking block shown in FIG. 7.

FIG. 8 shows a top view of the base plate 715 shown in FIG. 7, which base plate is now designated 815. The base plate 815 comprises two openings 816a or 816b. The openings 816a or 816b are associated with the locking element 710a or 710b and make it possible to insert the fastening element 760a or 760b in the locking element 710a or 710b.

As shown in FIG. 8, the opening 816a is larger than the opening 816b. This asymmetry in relation to the size of the two openings 816a and 816b reflects the asymmetry between the movable bearing and the fixed bearing. The movable bearing and the fixed bearing are provided on the corresponding bearing block, which is arranged opposite the locking block that comprises the base plate 815.

In order to ensure defined sliding of the snap-in webs 712a or 712b, the base plate 815 comprises tracks 817. These tracks 817 are simple and thus economical linear guides for the snap-in webs 712a or 712b.

Due to the different size of the two openings 816a and 816b, corresponding travel paths 818a and 818b that are associated with the two snap-in webs 712a or 712b differ in length. This ensures reliable snapping-in of a fastening element into the corresponding locking element even if the horizontal position of the corresponding fastening element is slightly out of alignment within the opening 816a, for example as a result of thermal distortion.

In addition, it should be pointed out that "comprising" does not exclude other elements or steps, and "a" or "one" does not exclude a plural number. Furthermore, it should be pointed out that features or steps, which have been described with reference to one of the above exemplary embodiments, can also be used in combination with other features or steps of other exemplary embodiments described above. Reference characters in the claims are not to be interpreted as limitations.

What is claimed is:

1. A fastening system comprising:
   an overhead stowage compartment including a first end spaced apart from a second end along a longitudinal axis defined by the overhead stowage compartment, the first end having a first hook and a second hook and the second end having a first fastening element and a second fastening element, the first fastening element comprising a bolt having a first opening at a distal end and the second fastening element comprising a bolt having a second opening at a distal end;
   a bearing block that includes a bearing bolt and a pair of outer webs and an intermediate middle web, with the bearing bolt received through the outer webs and middle web such that the bearing bolt defines a first bearing element portion and a second bearing element portion, the second bearing element portion couplable to the first hook and the first bearing element portion couplable to a respective hook of a second overhead stowage compartment;
   a locking block that includes a base plate comprising a first opening for inserting the first fastening element into locking block and a second opening for inserting a respective fastening element of a second overhead stowage compartment, and a first web and a second web each slidable between a first locked position and a second release position, the locking block including a first spring that biases the first web into the first position and a second spring that biases the second web into the first position, the first fastening element insertable in the first opening of the locking block such that the second web engages the first opening at the distal end of the first fastening element to couple the first fastening element to the locking block in the first position,
   wherein the overhead stowage compartment includes a releasing mechanism having an actuation device and a releasing mechanism comprising a deflection in interconnected by a mechanical wire connection, such that the releasing mechanism when actuated by the mechanical wire connection releases the affixation between the first fastening element and the locking block by the deflection in engaging and deflecting the second web from the first position to the second position.

2. The fastening system of claim 1,
   wherein each of the first and second hooks has a front end, and
   wherein a cross section of each of the first and second hooks tapers off continuously in the direction of the front end of each of the first and second hooks.

3. The fastening system of claim 1, further comprising:
   a docking station comprising at least one of an electrical system connection, an optical system connection and a pneumatic system connection that couples the overhead stowage compartment to an electrical system, optical system and pneumatic system of a means of locomotion.

4. The fastening system of claim 3, further comprising:
   several of the system connections together to form an interface.

5. The fastening system of claim 1, wherein the bearing bolt is a cylinder which, parallel to a longitudinal axis of the cylinder, on one side comprises a bevel.

6. The fastening system of claim 1, wherein the first opening of the first fastening element and the second opening of the second fastening element is a notch or a recess defined in a side of each of the first fastening element and the second fastening element and a respective one of the first web and the second web snaps into the notch or the recess of a respective one of the first and second fastening element.

7. The fastening system of claim 1, wherein at least one of the bearing block and the locking block is fastened, by means of a multiple support, to a chassis of a means of locomotion.

8. The fastening system of claim 1, wherein the overhead stowage compartment is arranged in a center of a passenger cabin of an aircraft.

9. The fastening system of claim 1, further comprising:
   a second overhead stowage compartment including a first end spaced apart from a second end, the first end having a third hook and a fourth hook and the second end having a third fastening element and a fourth fastening element, the third fastening element comprising a bolt having a third opening at a distal end and the fourth fastening element comprising a bolt having a fourth opening at a distal end,
   wherein the fourth hook of the second overhead stowage compartment is couplable to the first bearing element portion of the bearing block and the fourth fastening element of the second overhead stowage compartment is insertable in the second opening of the locking block such that the first web engages the fourth opening of the fourth fastening element to couple the fourth fastening element to the locking block.

10. The fastening system of claim 1, wherein the first web and the second web are slidably coupled on opposite ends of the base plate.

11. The fastening system of claim 10, wherein the first spring further comprises a first pair of springs and the second spring further comprises a second pair of springs.

12. The fastening system of claim 10, wherein the base plate includes a first pair of tracks that slidably couple the first web to the base plate and a second pair of tracks that slidably couple the second web to the base plate.

* * * * *